(No Model.) 3 Sheets—Sheet 1.
W. T. GOOLDEN & L. B. ATKINSON.
DYNAMO ELECTRIC MACHINE OR MOTOR.
No. 471,693. Patented Mar. 29, 1892.
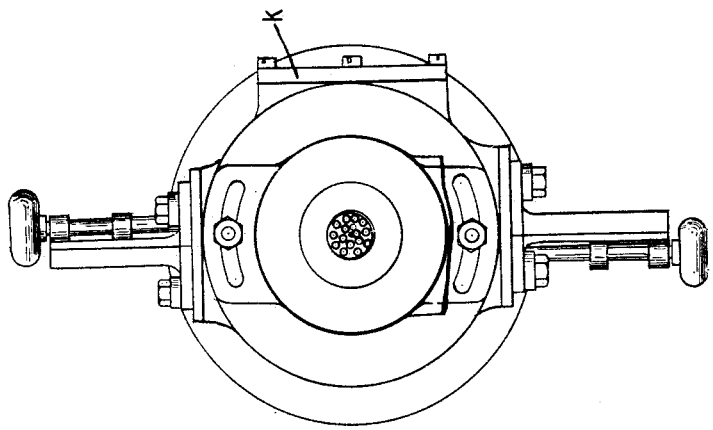
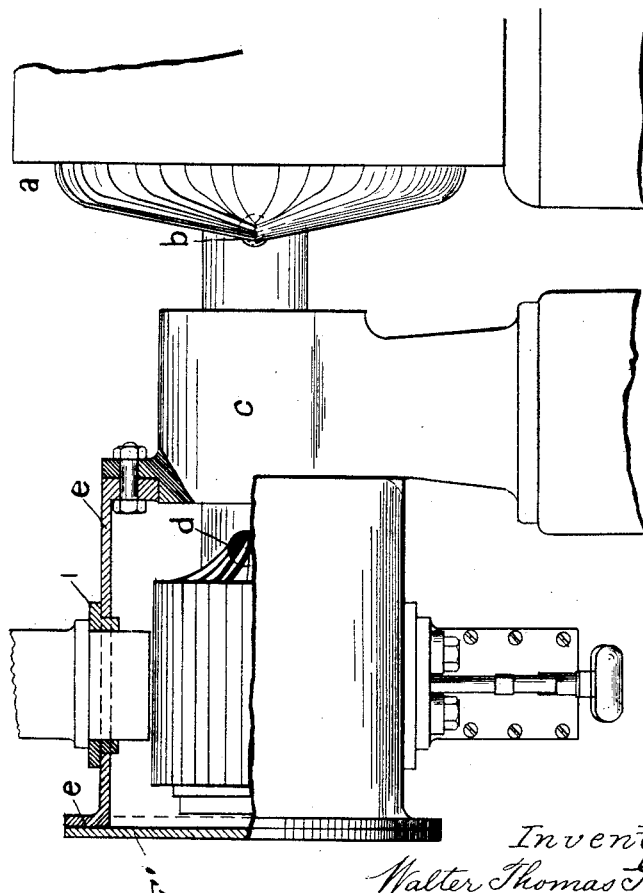
Witnesses:
H. Kusterer
Chester E. Finning
Inventors:
Walter Thomas Goolden
Llewelyn Birchall Atkinson
By Richards
Attorneys.

(No Model.) 3 Sheets—Sheet 2.

W. T. GOOLDEN & L. B. ATKINSON.
DYNAMO ELECTRIC MACHINE OR MOTOR.

No. 471,693. Patented Mar. 29, 1892.

Witnesses:
H. Kusterer
Chester E. ...

Inventors:
Walter Thomas Goolden
Llewelyn Birchall Atkinson
By Richards & ...
Attorneys.

(No Model.) 3 Sheets—Sheet 3.

W. T. GOOLDEN & L. B. ATKINSON.
DYNAMO ELECTRIC MACHINE OR MOTOR.

No. 471,693. Patented Mar. 29, 1892.

WITNESSES:
Louis S. Thomason
M. C. Ball.

INVENTORS
W. T. Goolden & L. B. Atkinson
by Richards & Co.
Attys.

UNITED STATES PATENT OFFICE.

WALTER T. GOOLDEN AND LLEWELYN B. ATKINSON, OF LONDON, ENGLAND.

DYNAMO-ELECTRIC MACHINE OR MOTOR.

SPECIFICATION forming part of Letters Patent No. 471,693, dated March 29, 1892.

Application filed August 18, 1891. Serial No. 403,073. (No model.) Patented in England December 2, 1887, No. 16,623.

*To all whom it may concern:*

Be it known that we, WALTER THOMAS GOOLDEN and LLEWELYN BIRCHALL ATKINSON, residing at London, England, have invented an Improvement in Dynamo-Electric Generators or Motors, (which has been patented to us in Great Britain, No. 16,623, dated December 2, 1887,) of which the following is a specification.

This invention relates to improvements in dynamo-electric generators and motors, and has for its object the provision of means for inclosing the brushes and commutators of such machines, so as to render them suitable for working in the presence of inflammable or explosive gases and under circumstances where it is necessary to exclude the atmosphere from these parts, the improvements relating more particularly to those cases where it is not necessary or from the nature of its construction advisable to inclose the whole armature.

Figure 4:
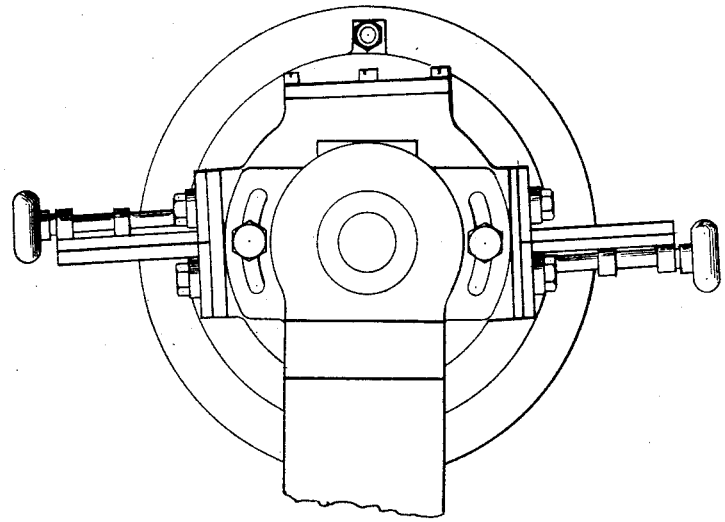
Figure 3:
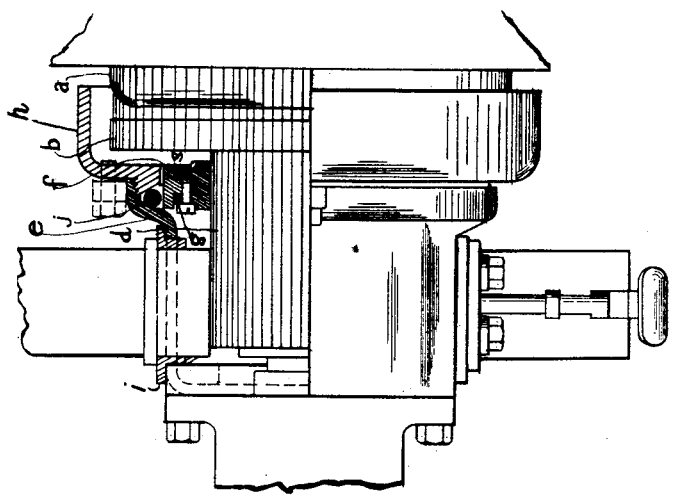
Figure 5:
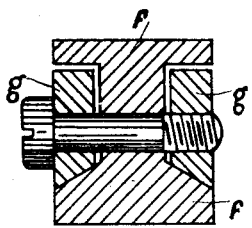

Figures 1 and 2 are a side elevation, partly in section, and an end elevation, respectively, of our device. Figs. 3 and 4 are a side elevation, partly in section, and an end elevation, respectively, of our device modified to suit another construction of dynamo. Fig. 5 is a view showing the fastening of the ring $f$.

In the case of a dynamo-electric generator or motor either of the open-coil or close-coil type and having a commutator of few parts or so constructed as to allow of small wires or connections being used to connect the armature-coils to the segments of the commutator a hollow shaft may be used through which the wires or connections pass to the commutator placed in this case outside or beyond the bearing or journal. When so placed, the whole commutator may be inclosed up to the journal, the brushes and their holders being either placed completely inside the casing or held partly protruding in the inclosed brush-holders composed of a movable or fixed casing carrying the brush-holders proper. This method of carrying our invention into effect is shown by Figs. 1 and 2 of the accompanying drawings. In these figures the ends of the coil-wires proceeding from the armature $a$ are carried through the opening $b$ into the hollow shaft passing through the bearing C and coming out to the commutator-collector sections at $d$. When employing brushes of the forward-thrust-box type, they are fixed into the case $e$ through insulating-pieces $i$, the whole case being capable of movement round the end of the bearing-bracket C, where it is fixed or clamped after being properly adjusted by means of the bolts and nuts shown. The end of the case F' is removable for inspection or adjustment of the interior parts, a side opening $k$ being also provided for the like purpose.

Should it be desired to employ brush-holders swinging on pivots or otherwise, the case $e$ would be so proportioned as to admit of its carrying the entire brush-holders and brushes, the same being mounted on a separate carrier, which may be attached to the inside of the casing in any suitable manner, as will be well understood.

Should the commutator connections be too large or for other reasons the above-described method of carrying this our invention into effect become undesirable, then the object may be attained by employing the following means: The brushes in this case are, as in the hereinbefore-described arrangement, partly or wholly inclosed in a casing or chamber, which may form part of the brush-holder, and may be either fixed or movable so as to allow of the adjustment of the brushes.

The casing or chamber incloses the commutator and has its end nearest the armature so formed as to embrace a packing-ring analogous to the packing-ring of an engine's piston-rod, and by this means the commutator is completely isolated from the outer atmosphere. The material employed for the packing-ring would be an insulating material, asbestus being a very suitable material for the purpose, while, further, to avoid the possible short-circuiting of the armature-coils that might be caused by the fine copper particles (due to the wearing of the commutator and brushes) becoming attached to the packing a ring of insulating material or of metal insulated from it may be suitably secured to the commutator, the packing bearing on this ring instead of on the commutator direct. In this case the packing may be of asbestus, metal gauze, or other suitable material, or spring-rings may be employed for the purpose. The chamber surrounding the commutator may be provided with openings for ventilation or inspection, the openings being protected by gauze, glass, mica, or other suitable material. The chamber may be filled with a non-supporter of combustion, such as carbonic-acid gas, or it may be arranged so as to be capable of receiving a supply of such gas should it be necessary. This method of carrying our invention into effect is shown by Figs. 3 and 4 of the accompanying drawings. In these figures $a$ is the armature whose coils are connected by the radial coil connections $b$ to the segments of the commutator $d$. The brushes of the forward-thrust-box type are carried by insulating-pieces $i$, passing through the chamber or case $e$, which, as in the previously-described arrangement illustrated by Figs. 1 and 2, is capable of being rocked for the purpose of altering the position of the brushes on the commutator $d$. On the commutator $d$ is placed an insulating-ring $f$, which is securely fixed by being carried between two inclined wedging-rings $g\ g$. It will be seen that if ring $f$ is formed in halves or even divided in one place only, that when the rings $g\ g$, having inclined internal peripheries, are drawn together by the screws the ring $f$ will be reduced in diameter and forced down upon the shaft tight, sufficient clearance being allowed in the ring $f$ and between ring $f$ and rings $g\ g$ to allow sufficient movement of the parts to effect the tightening result. The end of the case $e$ nearest the armature is constructed to receive a packing-gland $h$, which on being screwed home presses on the packing-ring $j$ and so brings it into contact with and all round the insulating-collar. It will be understood that in this method of carrying our invention into effect brushes of the rocking bar or other type may be employed, the chamber or casing $e$ being proportionately enlarged and suitably constructed, as was shown with reference to the first-described method.

When designed to cover or protect the commutators of dynamo-electric machines having ring-armatures, the insulating-collar, as shown at $f$, Fig. 3, may be carried direct on the shaft, the wires connecting the coils on the armature with the segments of the commutator and which wires in this type of machine run parallel with the shaft for some distance, passing through suitable holes or slots in the collar. By this means the collar may be mounted direct on the shaft instead of on the commutator, as shown in Fig. 3.

Having now particularly described and ascertained the nature of our said invention and in what manner the same is to be performed, we declare that what we claim is—

1. In a dynamo-electric generator or motor, the combination, with the commutator, of a fixed air-tight inclosing cover, making absolute stationary and rubbing joints throughout and carrying the brushes, the cover being capable of adjustment by slotted bolt-holes in the fixed frame through a suitable angle to give required lead to the brushes.

2. In a dynamo-electric generator or motor, the combination, with the commutator, of a fixed air-tight inclosing cover, making an absolute contact-joint with the rotating periphery of the commutator armature or ring fixed thereon by means of a packing-ring placed in a gland suitable for screwing up the said packing upon the revolving surface.

In testimony whereof we have signed our names to this specification in the presence of two subscribing witnesses.

WALTER T. GOOLDEN.
LLEWELYN B. ATKINSON.

Witnesses:
 TOM. M. TULEY,
 CHARLES F. ARROWSMITH.